(12) United States Patent
Kadowaki et al.

(10) Patent No.: US 8,518,524 B2
(45) Date of Patent: Aug. 27, 2013

(54) TRANSPARENT COMPOSITE MATERIAL

(75) Inventors: Yasushi Kadowaki, Oita (JP); Kazufumi Kai, Oita (JP); Ryoji Toita, Oita (JP)

(73) Assignee: Showa Denko K.K., Tokyo (JP)

( * ) Notice: Subject to any disclaimer, the term of this patent is extended or adjusted under 35 U.S.C. 154(b) by 376 days.

(21) Appl. No.: 12/373,977

(22) PCT Filed: Jul. 20, 2007

(86) PCT No.: PCT/JP2007/064718
§ 371 (c)(1), (2), (4) Date: Jan. 15, 2009

(87) PCT Pub. No.: WO2008/010610
PCT Pub. Date: Jan. 24, 2008

(65) Prior Publication Data
US 2009/0324922 A1    Dec. 31, 2009

(30) Foreign Application Priority Data

Jul. 21, 2006  (JP) ................................ 2006-199278

(51) Int. Cl.
| B32B 27/36 | (2006.01) |
| C08L 67/00 | (2006.01) |
| B05D 3/12  | (2006.01) |
| B05D 1/28  | (2006.01) |
| B05D 3/02  | (2006.01) |

(52) U.S. Cl.
USPC .. 428/220; 427/369; 427/428.01; 427/428.14; 427/372.2; 524/878; 524/711

(58) Field of Classification Search
USPC ................. 428/220; 524/878, 791; 427/369, 427/428.01, 428.14, 372.2
See application file for complete search history.

(56) References Cited

U.S. PATENT DOCUMENTS 5,380,809 A * 1/1995 Uchida et al. ............ 526/318.43
2007/0148442 A1  6/2007 Shibayama et al.
2008/0280073 A1 * 11/2008 Yamamoto .................... 428/1.54
2009/0166589 A1 *  7/2009 Kadowaki et al. ............ 252/500
2012/0022191 A1 *  1/2012 Toita et al. .................... 524/115

FOREIGN PATENT DOCUMENTS

| EP | 1 473 329 A1 | 11/2004 |
| EP | 1473329 A1 * | 11/2004 |
| EP | 1 624 024 A1 | 2/2006 |
| JP | 10-330534 A | 12/1998 |
| JP | 2003-017244 A | 1/2003 |
| JP | 2004-051935 A | 2/2004 |
| JP | 2005-084254 A | 3/2005 |
| JP | 2005-113107 A | 4/2005 |
| JP | 2005-156998 A | 6/2005 |
| JP | 2006-083225 A | 3/2006 |
| JP | 2006-096861 A | 4/2006 |
| WO | 2005/056683 A | 6/2005 |
| WO | WO 2006112525 A1 * | 10/2006 |

OTHER PUBLICATIONS

Takahiro Imai, et al., "Preparation and Properties of Epoxy-Organically Modified Layered Silicate Nanocomposites", Conference Record of the 2002 IEEE International Symposium on Electrical Insulation, Boston, MA, USA, Apr. 2002, pp. 379-383, XP10588870.
European Patent Communication in corresponding European Patent Application No. 07 791 415.8 dated Jul. 6, 2010.
Soek-Ho Hwang, et al., "Synthesis of Allylester Resin Tethered to Layered Silicates by in-situ Polymerization and its Nanocomposite," Polymer Bulletin, v. 29 (5), pp. 329-335, Springer-Verlag (Jan. 2003).

* cited by examiner

*Primary Examiner* — David Sample
*Assistant Examiner* — Tahseen N. Khan
(74) *Attorney, Agent, or Firm* — Sughrue Mion, PLLC

(57) ABSTRACT

The invention provides a transparent composite material comprising a cured product of a three-dimensionally crosslinkable resin composition containing tabular inorganic substance having a number-average particle size of 10 to 300 nm and an aspect ratio of 10 to 300 dispersed therein, which material has a small coefficient of thermal expansion against surrounding temperature changes and can be suitably applicable as substrate for display devices, to thereby overcome disadvantages in substrate for display devices using conventional materials that differences in thermal shrinkage between a substrate and an transparent electrode cause cracks in the transparent electrode, resulting in increasing resistance and causing disconnection, and further can provide a display device with high durability.

35 Claims, No Drawings

TRANSPARENT COMPOSITE MATERIAL

TECHNICAL FIELD

The present invention relates to a transparent composite material excellent in dimension stability and property of low coefficient of thermal expansion, transparent film, transparent sheet and transparent plate using the material, and a production method thereof.

BACKGROUND ART

Conventionally, as transparent electroconductive substrate used in liquid crystal display, organic EL display and the like, glass is used. Recently, there have been demands for its shift to plastic material in light of weight reduction, shatter-proofing property and flexibility. For example, substrates consisting of polyethylene terephthalate, polycarbonate, polyolefin or polyether sulfone has been proposed (for example, see Japanese Patent Application Laid-Open No. 2003-17244).

However, these resin-based substrate materials for display devices have large coefficients of thermal expansion, which are in a range of about 30 to 100 ppm/° C. at 50 to 150° C. If such a material is used to produce a display substrate, difference in thermal expansion between the display substrate and a transparent electrode leads to disadvantages including generation of cracks in the transparent electrode due to changes in the surrounding temperature, resulting in increasing resistance and further generation of disconnection. Therefore, there have been demands for transparent substrates for display devices with small coefficients of thermal expansion.

In Japanese Patent Application Laid-Open No. 10-330534, thermosetting resin containing lamellar clay minerals is disclosed. However, the invention is aiming at improving thermal resistance and mechanical strength, which does not relate to the resin of the present invention having transparency and a small coefficient of thermal expansion.

DISCLOSURE OF INVENTION

The object of the present invention is to provide a transparent composite material having a small coefficient of thermal expansion due to temperature changes, suitably used as substrates in display devices.

The present inventors have made extensive studies with a view to solving the above problem and as a result, they have found out that a cured product of three-dimensionally crosslinkable resin composition in which tabular inorganic substance having specific properties is dispersed can become a transparent composite material with a small coefficient of thermal expansion, thus completing the present invention.

That is, the present invention relates to the following 1 to 33.

1. A transparent composite material, comprising a cured product of a three-dimensionally crosslinkable resin composition containing tabular inorganic substance having a number-average particle size of 10 to 300 nm and an aspect ratio of 10 to 300 dispersed therein.
2. The transparent composite material according to 1 above, wherein the tabular inorganic substance is inorganic lamellar compound.
3. The transparent composite material according to 2 above, wherein the inorganic lamellar compound is at least one kind selected from a group consisting of smectite, talc, kaolinite and mica (isinglass).
4. The transparent composite material according to 2 above, wherein the inorganic lamellar compound is layered silicate hydrophobized by cation exchange method using cationic surfactant.
5. The transparent composite material according to any one of 1 to 4 above, wherein the amount of the tabular inorganic substance is within a range of 10 to 70 mass %.
6. The transparent composite material according to any one of 1 to 5 above, wherein the three-dimensionally crosslinkable resin composition is a resin composition not containing an aromatic ring.
7. The transparent composite material according to any one of 1 to 5 above, wherein the three-dimensionally crosslinkable resin composition is an allyl ester resin composition and/or crosslinkable acrylic resin composition.
8. The transparent composite material according to 7 above, wherein the allyl ester resin composition is a composition containing an allyl ester compound having an ester structure formed from polyhydric alcohol and dicarboxylic acid, with allyl group and/or methallyl group as terminal group.
9. The transparent composite material according to 8 above, wherein the allyl ester resin composition further contains at least one compound selected from compounds represented by formula (1).

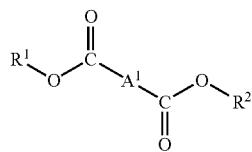

(In the formula, $R^1$ and $R^2$ each independently represents allyl group or methallyl group, $A^1$ represents an organic residue derived from dicarboxylic acid having at least one structure of alicyclic structure, aromatic ring structure and aliphatic chain structure.)

10. The transparent composite material according to 9 above, wherein the dicarboxylic acid in formula (1) is dicarboxylic acid having alicyclic structure.
11. The transparent composite material according to 10 above, wherein the dicarboxylic acid having alicyclic structure is 1,4-cyclohexane dicarboxylic acid.
12. The transparent composite material according to 8 above, wherein at least one kind of the allyl ester compound has a group represented by formula (2) as terminal group and has a branched structure represented by formula (3) as a constituent unit.

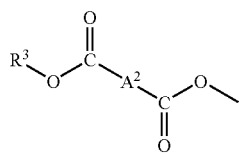

(In the formula, $R^3$ represents an allyl group or a methallyl group, $A^2$ represents an organic residue derived from dicarboxylic acid having at least one structure of alicyclic structure, aromatic ring structure and aliphatic chain structure.)

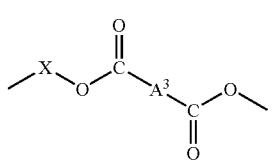

(In the formula, $A^3$ represents an organic residue derived from dicarboxylic acid having at least one structure of alicyclic structure, aromatic ring structure and aliphatic chain structure. X represents one or more kinds of organic residue derived from polyhydric alcohol, provided that, through ester bond, X can further have formula (2) as terminal group and a branched structure including formula (3) as constituent unit.)

13. The transparent composite material according to 12 above, wherein the dicarboxylic acid in formulae (2) and (3) is dicarboxylic acid having alicyclic structure.
14. The transparent composite material according to 13 above, wherein the dicarboxylic acid having alicyclic structure is 1,4-cyclohexane dicarboxylic acid.
15. The transparent composite material according to any one of 7 to 14 above, wherein the allyl ester resin composition further contains reactive monomers.
16. The transparent composite material according to any one of 1 to 15 above, wherein the average coefficient of thermal expansion in a planar direction at 50 to 150° C. is 50 ppm/° C. or less.
17. A transparent film comprising the transparent composite material according to any one of 1 to 16 above, having a thickness of 10 to 200 μm.
18. A transparent sheet comprising the transparent composite material according to any one of 1 to 16 above, having a thickness of 200 to 5000 μm.
19. A transparent plate comprising the transparent composite material according to any one of 1 to 16 above, having a thickness exceeding 5000 μm.
20. The transparent film according to 17 above, wherein the tabular inorganic substance is oriented in a planar direction.
21. The transparent sheet according to 18 above, wherein the tabular inorganic substance is oriented in a planar direction.
22. The transparent plate according to 19 above, wherein the tabular inorganic substance is oriented in a planar direction.
23. A method for producing the transparent film described in 17 or 20 above, wherein after the three-dimensionally crosslinkable resin composition before curing, containing a tabular inorganic substance dispersed therein and solvent, is spread and applied on a smooth-surface plane and the solvent is dried, the composition is sandwiched between smooth-surface sheets or films and then curing is conducted.
24. A method for producing the transparent sheet described in 18 or 21 above, wherein after the three-dimensionally crosslinkable resin composition before curing, containing a tabular inorganic substance dispersed therein and solvent, is spread and applied on a smooth-surface plane and the solvent is dried, the composition is sandwiched between smooth-surface sheets or films and then curing is conducted.
25. A method for producing the transparent plate described in 19 or 22 above, wherein after the three-dimensionally crosslinkable resin composition before curing, containing a tabular inorganic substance dispersed therein and solvent, is spread and applied on a smooth-surface plane and the solvent is dried, the composition is sandwiched between smooth-surface sheets or films and then curing is conducted.
26. A method for producing the transparent composite material according to any one of 1 to 16 above, comprising a step of mixing a solution of the tabular inorganic substance dispersed in solvent with a three-dimensionally cross-linkable resin composition.
27. The method for producing a transparent composite material according to 26 above, wherein the tabular inorganic substance is an inorganic lamellar compound.
28. The method for producing a transparent composite material according to 27 above, comprising a step of mixing a solution containing resin component of the three-dimensionally cross-linkable resin composition dissolved in solvent with a dispersion solution containing the tabular inorganic substance swollen or cleaved in solvent.
29. The method for producing the transparent composite material according to 26 above, comprising a step of spreading a mixture of resin component of a three-dimensionally cross-linkable resin composition, a tabular inorganic substance and solvents on a surface while applying a force parallel to the coated surface.
30. The method for producing a transparent composite material according to 29 above, wherein the step of spreading the mixture on a surface while applying a force parallel to the coated surface is roll-coating method and doctor-blade method.
31. The method for producing the transparent composite material according to 26 above, comprising a step of spreading a mixture of resin component of a three-dimensionally cross-linkable resin composition, tabular inorganic substance and vaporizable solvents on a substrate to be coated and then allowing the tabular inorganic substance to be oriented in a planar direction by letting the solvents vaporize.
32. The method for producing a transparent composite material according to any one of 29 to 31 above, wherein the tabular inorganic substance is inorganic lamellar compound.
33. The method for producing a transparent composite material according to any one of 29 to 32 above, wherein the mixture is spread on a substrate to be coated and dried to obtain a resin film containing the tabular inorganic substance dispersed therein and then the film is cured to be a film or a sheet.

Substrates for display devices using conventional transparent composite materials have disadvantages that the difference in coefficients of thermal expansion between the substrate and a transparent electrode provided thereon is large and as the surrounding temperature changes, differences in thermal shrinkage between the substrate and the transparent electrode are generated, which causes cracks in the transparent electrode, resulting in increasing resistance and causing disconnection. The substrate for display devices, using transparent composite material having an extremely small coefficient of thermal expansion according to the present invention, can solve the above problem to provide highly-durable display devices and therefore, the present invention is extremely useful industrially. Moreover, according to the present invention, a transparent sheet or film, flexible and having a small coefficient of thermal expansion, can be provided by employing a specific resin composition and therefore, the present invention can be applied in the fields of flexible display devices, solar batteries and the like.

BEST MODE FOR CARRYING OUT THE INVENTION

Hereinafter, the present invention is described in details.

The present invention relates to a transparent composite material wherein tabular inorganic substance having a number-average particle size of 10 to 300 nm and an aspect ratio of 10 to 300 is dispersed in three-dimensionally crosslinkable resin composition, a transparent plate, a transparent film and a transparent sheet comprising the transparent composite material and a production method thereof.

[Transparent Composite Material]

The transparent composite material of the present invention contains tabular inorganic substance having a number-average particle size of 10 to 300 nm and the aspect ratio of 10 to 300 dispersed in three-dimensionally crosslinkable resin composition. Generally, the material can be obtained by mixing the tabular inorganic substance with the three-dimensionally crosslinkable resin composition and curing the mixture.

In the present invention, transparency of the transparent composite material is evaluated in terms of total light transmittance. The transparent composite material of the present invention has total light transmittance of 70% or more with a haze value of 5% or less. It is preferable that the total light transmittance be 80% more, more preferably 85% or more. If the total light transmittance is less than 70%, light loss becomes large, which is not preferred. Also, the preferred haze value of the transparent composite material 5% or less, more preferably 3% or less. If the haze value exceeding 5%, transmitted light is distorted, resulting in lack of clarity in some cases. The total light transmittance is a value measured according to JIS K-7361-1 and the haze value is measured according to JIS K-7136.

There is no limitation on the shape of the transparent composite material. Preferred examples include film, sheet and plain plate. In the present invention, those having a thickness of 10 to 200 μm are referred to as film, those having a thickness exceeding 200 and within 5000 μm are referred to as sheet and those having a thickness exceeding 5000 μm are referred to as a plate.

[Tabular Inorganic Substance]

In the present invention, the tabular inorganic substance is not particularly limited as long as the number-average particle size is within a range of 10 to 300 nm and the aspect ratio is within a range of 10 to 300.

The Number-average Particle Size of Tabular Inorganic Substance

In a case where the transparent substrate of the present invention is used as substrate for display devices or the like, the number-average particle size of the tabular inorganic substance needs to be smaller enough than wavelength of visible light. The term "visible light" used herein means light with a wavelength of 400 to 800 nm. Therefore, it is preferable that the number-average particle size of the tabular inorganic substance be within a range of 10 to 300 nm, more preferably 30 to 200 nm. If the number-average particle size is less than 10 nm, the coefficient of thermal expansion in a planar direction of the transparent substrate does not become small enough. If the size exceeds 300 nm, particles having sizes overlapping with visible light wavelength and therefore, it is disadvantageous in light of transparency.

The term "number-average particle size of the tabular inorganic substance" means a number-average particle size measured by dynamic light scattering method while dispersing the substance in solvent. A number-average particle size can be calculated by dynamic light scattering method, according to, for example, pages 169 to 179 in "Measurements Techniques of Particle Diameter" (edited by The Society of Powder Technology, Japan: 1994). Examples of measurement apparatus used here include Dynamic Light Scattering Nano-Particle Size Analyzer LB-550 (manufactured by HORIBA, Ltd.). The number-average particle size of tabular inorganic substance measured by the dynamic light scattering method can be considered to be substantially the same as number-average particle size of the tabular inorganic substance after dispersed in the resin layer in the present invention.

Aspect Ratio of Tabular Inorganic Substance

The aspect ratio (Z) of tabular inorganic substance can be represented by formula $Z=L/a$. "L" is the number-average particle size of tabular inorganic substance in solvent measure by the above dynamic light scattering method, "a" is unit thickness of the tabular inorganic substance. The unit thickness "a" is a value calculated by measuring diffraction peaks of the tabular inorganic substance by X-ray diffraction method.

In the present invention, it is preferable that the tabular inorganic substance have an aspect ratio of 10 to 300, more preferably 30 to 200.

From the viewpoint of tendency to be oriented in a planar direction of transparent substrate, it is preferable that the aspect ratio is 10 or more. In a case of tabular inorganic substance having an aspect ratio of less than 10, the coefficient of thermal expansion may fall outside the predetermined range (preferably 50 ppm/° C. or less). On the other hand, if a tabular inorganic substance having an aspect ratio exceeding 300 is used, transparency of the substrate may be deteriorated.

The Amount of the Tabular Inorganic Substance Contained

It is preferable that the amount of the tabular inorganic substance contained in the transparent composite material be within a range of 10 to 70 mass more preferably 20 to 60 mass %.

If the amount of the tabular inorganic substance is less than 10 mass %, the average coefficient of thermal expansion of the transparent composite material at 50 to 150° C. is increased, resulting in a tendency to sometimes exceed 50 ppm/° C.

If the amount of the tabular inorganic substance contained exceeds 70 mass %, it tends to be difficult to uniformly disperse the tabular inorganic substance in resin.

[Inorganic Layered Compound]

It is preferable that the tabular inorganic substance in the present invention be inorganic layered compound.

An inorganic layered compound is an inorganic compound having a lamellar structure consisting of unit crystal layers stacked one on another. Inorganic layered compound swollen or cleaved in a solvent is preferably used.

Preferred examples of such an inorganic layered compound include lamellar clay minerals having property of being cleaved or swollen in solvent, lamellar double hydroxide such as hydrotalcite, and lamellar polysilicates such as magadiite, kanemite and kenyaite. Examples of lamellar clay minerals include smectites such as montmorillonite, hectorite, stevensite, saponite and beidellite and kaolinite, dickite, nacrite, halloysite, antigorite, chrysotile, pyrophylite, tetrasililic mica, sodium tainiolite, white mica, margarite, talc, vermiculite, phlogopite, xanthophyllite and chlorite.

More preferred among these is at least one inorganic layered compound selected from the group consisting of smectite, talc, kaolinite and mica in terms of dispersibility and size, and still more preferred is smectite.

Among lamellar clay minerals, with respect to layered silicate (e.g., smectite), those hydrophobized by chemical treatment to have improved dispersibility in resin are preferred. Examples of the chemical treatment include a treatment of exchanging exchangeable metal cations such as those of sodium and calcium present between layers of silicate having lamellar surface of its flake-like crystals with various substances such as cationic surfactant having cationic property to intercalate between crystal layers of layered silicate.

In this case, there is no limitation on cation exchange capacity in the layered silicate. It is preferable that the capacity be within a range of 50 to 1200 mEq/100 g.

If the cation exchange capacity is less than 50 mEq/100 g, the amount of cationic substance to be intercalated between crystal layers of the layered silicate through cation exchange becomes small, which may lead to failure in achieving sufficient nonpolarization (hydrophobidization) between crystal layers. If the cation exchange capacity exceeds 1200 mEq/100 g, binding force between crystal layers of layered silicate becomes so strong that it becomes difficult for crystal flakes to be peeled off in some cases.

Specifically, the above chemical treatment can be conducted by the following chemical modification.

The above chemical modification is also called as cation exchange method using cationic surfactant. Specifically, it is a method where cation exchange is conducted between layered silicate layers by using cationic surfactant to thereby hydrophobidize. This method is effective in a case where resin component of the transparent composite material of the present invention has low polarity, to enhance affinity between the layered silicate and the low-polarity resin to thereby achieve more uniform microdispersion of the layered silicate in the low-polarity resin.

There is no particular limitation on cationic surfactant used herein. Examples include quaternary ammonium salt and quaternary phosphonium salt. Among them, based on the advantage of ability to sufficiently hydrophobidizing between layered silicate layers, it is preferable to use alkyl ammonium ion salt having 6 or more carbon atoms, aromatic quaternary ammonium ion salt or heterocyclic quaternary ammonium ion salt.

There is no limitation on the quaternary ammonium salt. Examples thereof include trimethyl alkyl ammonium salt, triethyl alkyl ammonium salt, tributylalkyl ammonium salt, dimethyl dialkyl ammonium salt, dibutyl dialkyl ammonium salt, methylbenzyl dialkyl ammonium salt, dibenzyl dialkyl ammonium salt, trialkyl methyl ammonium salt, trialkyl ethyl ammonium salt, trialkylbutyl ammonium salt; quaternary ammonium salts having an aromatic ring such as benzylmethyl{2-[2-(p-1,1,3,3-tetramethylbutylphenoxy)ethoxy]ethyl}ammonium chloride; quaternary ammonium salts derived from aromatic amine such as trimethylphenyl ammonium; quaternary ammonium salts having a heterocyclic ring such as alkyl pyridinium salt and imidazolium salt; dialkyl quaternary ammonium salt having two polyethylene glycol chains, dialkyl quaternary ammonium salt having two polypropylene glycol chains, trialkyl quaternary ammonium salt having one polyethylene glycol chain, and trialkyl quaternary ammonium salt having one polypropylene glycol chain. Among them, lauryl trimethyl ammonium salt, stearyl trimethyl ammonium salt, trioctyl methylammonium salt, distearyl dimethyl ammonium salt, dihydrogenated beef tallow dimethyl ammonium salt, distearyl dibenzyl ammonium salt and N-polyoxyethylene-N-lauryl-N,N-dimethyl ammonium salt are preferred. One of these quaternary ammonium salts may be used singly or two or more of them may be used in combination.

There is no limitation on the quaternary phosphonium salt. Examples thereof include dodecyl triphenylphosphonium salt, methyl triphenyl phosphonium salt, lauryl trimethyl phosphonium salt, stearyl trimethyl phosphonium salt, trioctyl methyl phosphonium salt, distearyl dimethyl phosphonium salt and distearyl dibenzyl phosphonium salt. One of these quaternary phosphonium salts may be used singly or two or more of them may be used in combination.

Further, by using a modified compound, layered silicate can be highly dispersed in three-dimensionally crosslinkable resin composition. However, with respect to enhancement of dispersibility by using a modified compound, generally, it is preferable to use modified aliphatic compounds for three-dimensionally cross-linked resin having many aliphatic carbon chains or use modified aromatic compounds for three-dimensionally cross-linked resin having many aromatic carbon chains.

[Three-dimensionally Crosslinkable Resin Composition]

For the three-dimensionally crosslinkable resin composition in the present invention, as long as its cured product containing tabular inorganic substance (after three-dimensional crosslinking reaction) can be transparent, conventional thermosetting resin composition, photocurable resin composition or the like may be used.

Examples include allyl ester resin, cross-linkable acrylic resin, epoxy resin, thermosetting modified polyphenylene ether resin, thermosetting polyimide resin, silicon resin, benzoxadine resin, melamine resin, urea resin, phenol resin, bismaleimide-triazine resin, alkyd resin, furan resin, polyurethane resin and aniline resin. Preferred among them are radically-reactive three-dimensionally cross-linked resins such as allyl ester resin, cross-linkable acrylic resin, which allow crosslinking reaction to proceed through radical polymerization. One of these curable resins may be used singly or two or more of them may be used in combination.

From the viewpoint of good affinity with tabular inorganic substance and obtaining higher transparency, curable resin without having aromatic ring structure is more preferred.

Generally, a term "thermosetting resin" can mean both a resin in a prepolymer state before cured (including oligomer, additives and monomer) and a product obtained after curing such a resin. In the present Description, the term "resin composition" is used to mean a resin in a prepolymer state before cured.

The radically-reactive three-dimensionally crosslinkable resin composition of the present invention consists of a radically-reactive three-dimensionally cross-linked resin having as essential component, oligomer component two or more radically-reactive functional groups such as vinyl group and allyl group (here, it means resin component before cured or it may be called prepolymer or oligomer and may include monomer components), and tabular inorganic substance having a number-average particle size of 10 to 300 nm and an aspect ratio of 10 to 300. If necessary, reactive diluent (reactive monomer), curing agent (radical polymerization initiator) or various additives may be contained. When it is in form of a resin composition, it may contain a solvent not participating in crosslinking reaction for the purpose of reducing viscosity to enhance processability. However, such a solvent must be removed by the final stage of production process.

[Allyl Ester Resin Composition]

The allyl ester resin composition of the present invention is a composition containing as its main component a compound having an allyl group or methallyl group (hereinafter, these two groups are referred to in conjunction as "(meth)allyl group") and ester structure.

Such a compound having a (meth)allyl group and ester structure can be obtained by
(1) esterification reaction between a compound having a (meth)allyl group and hydroxyl group (here, nemed generically as "allyl alcohol") and a compound having a carboxyl group,
(2) esterification reaction between a compound having a (meth)allyl group and a carboxyl group and a compound having a hydroxyl group, or
(3) ester exchange reaction between an ester compound consisting of allyl alcohol and dicarboxylic acid and a polyhydric alcohol.

In a case where the compound "having a carboxyl group" in the above (1) and (2) is a polyester oligomer between dicarboxylic acid and diol, only terminals may be esterified with allyl alcohol.

In the above (3), examples of "an ester compound consisting of allyl alcohol and dicarboxylic acid" include at least one compound selected from compounds represented by formula (1).

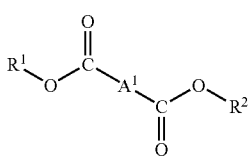

(1)

(In the formula, $R^1$ and $R^2$ each independently represent an allyl group or methallyl group, $A^1$ represents an organic residue derived from dicarboxylic acid having at least one structure of alicyclic structure, aromatic ring structure and aliphatic chain structure.)

This compound not only serves as raw material for allyl ester oligomer described later but also may be contained as reactive diluent (reactive monomer) in the allyl ester resin composition of the present invention. It is preferable that what is represented by $A^1$ in formula (1) be the same as what $A^2$ and $A^3$ represent in formulae (2) and (3) described later.

It is preferable that the compound serving as the main cured component of the allyl ester resin composition in the present invention, having a (meth)allyl group and ester structure, be an ester compound having an allyl group and/or methallyl group as terminal group and ester structure formed from polyhydric alcohol and dicarboxylic acid (hereinafter, sometimes referred to "allyl ester oligomer").

Further, as other components, curing agents, reactive monomers, additives, other radically-reactive resin components and the like, as described later, may be contained.

[Allyl Ester Oligomer]

Preferred example of the allyl ester oligomer in the present invention is a compound having a group represented by formula (2) as terminal group and a structure represented by formula (3) as constituent unit.

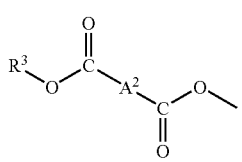

(2)

(In the formula, $R^3$ represents an allyl group or methallyl group, $A^2$ represents an organic residue derived from dicarboxylic acid having at least one structure of alicyclic structure, aromatic ring structure and aliphatic chain structure.)

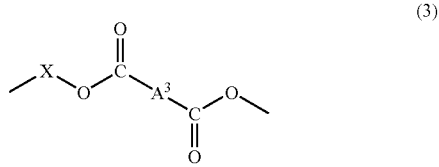

(3)

(In the formula, $A^3$ represents an organic residue derived from dicarboxylic acid having at least one structure of alicyclic structure, aromatic ring structure and aliphatic chain structure. X represents at least one organic residue derived from polyhydric alcohol. X may further contain the above formula (2) as terminal group and a branched structure having the above formula (3) as constituent unit.)

In the allyl ester oligomer of the present invention, there are at least two terminal groups represented formula (2). In a case where X in formula (3) has a branched structure, there are three or more of such terminal groups represented formula (2). In this case, two or more $R^3$s are present in each of the terminal groups and these $R^3$s do not necessarily have to be the same with each other, for example it may be an allyl group in one terminal and it may be a methallyl group in another terminal group.

Also, it is not required that every one of $R^3$s be an allyl group or a methallyl group. Within an extent that does not impair curability, part of them may be a non-polymerizable group such as methyl group and ethyl group.

As for the structure represented by $A^2$, the terminal groups may be different from each other. For example, $A^2$ in one terminal group may be a benzene ring, and $A^2$ in another terminal group may be a cyclohexane ring.

$A^2$ in formula (2) is an organic residue derived from dicarboxylic acid having at least one structure of alicyclic structure, aromatic ring structure and aliphatic chain structure.

The part derived from dicarboxylic acid is represented by carbonyl structure adjacent to $A^2$. Therefore, $A^2$ portion shows a benzene skeleton or cyclohexane skeleton. In terms of transparency, dicarboxylic acid having alicyclic structure or aliphatic chain structure is more preferred than dicarboxylic acid having aromatic structure.

There is no limitation on dicarboxylic acid from which $A^2$ structure is derived from. Examples include terephthalic acid, isophthalic acid, phthalic acid,1,4-cyclohexane dicarboxylic acid,1,4-naphtalene dicarboxylic acid, 1,5-naphtalene dicarboxylic acid, 2,7-naphtalene dicarboxylic acid, diphenyl-m,m'-dicarboxylic acid, diphenyl-p,p'-dicarboxylic acid, benzophenone-4,4'-dicarboxylic acid, p-phenylene diacetic acid, p-carboxyphenyl acetic acid, methyl terephthalic acid, tetrachlorophthalic acid, malonic acid, succinic acid, glutaric acid, adipic acid, 2-methyl succinic acid, maleic acid, fumaric acid, itaconic acid, citraconic acid and endic anhydride. Among these dicarboxylic acids, dicarboxylic acid having an aliphatic chain structure or alicyclic structure is preferred. Preferred examples thereof include malonic acid, succinic acid, glutaric acid, adipic acid, 2-methyl succinic acid and 1,4-cyclohexane dicarboxylic acid. More preferred is dicarboxylic acid having an alicyclic structure. Examples thereof include 1,4-cyclohexane dicarboxylic acid.

When a compound having alicyclic structur such as 1,4-cyclohexane dicarboxylic acid is used as dicarboxylic acid from which $A^2$ structure is derived, flexible molded product can be obtained, which makes it easy to form it into transparent films or the like. Moreover, dispersibility of tabular inorganic substance into resin is good and therefore, as compared with the case using aromatic dicarboxylic acid, a transparent composite material having excellent transparency and little coloration can be obtained.

At least one structural unit represented by formula (3) is required in the allyl ester oligomer. It is preferred that the molecular weight of the entire allyl ester oligomer be increased to a certain level by repeating this structural unit, to obtain viscosity suitable for enhancing workability and improve strength of cured product.

However, if the molecular weight is too large, the molecular weight between crosslinking points of the cured product becomes too large, which leads to decrease in glass transition temperature (Tg) and may lead to decrease in heat resistance. It is important to appropriately adjust the molecular weight according to uses.

The allyl ester resin composition of the present invention contains tabular inorganic substance having a number-average particle size of 10 to 300 nm and an aspect ratio of 10 to 300.

By containing this tabular inorganic substance, glass transition temperature (Tg) and the coefficient of thermal expansion can be enhanced while maintaining transparency of the resin composition. If the molecular weight of the allyl ester oligomer is too small, the cured product tends to be fragile. Therefore, in the allyl ester resin composition of the present invention, it is preferable that the molecular weight of the allyl ester oligomer be adjusted to be high, preferably the weight-average molecular weight is within a range of 500 to 100,000, more preferably 1,000 to 50,000.

There is no particular limitation on selection of oligomer skeleton. There is a tendency that if a linear oligomer with a large molecular weight is used, a resin relatively flexible and having high strength can be obtained. If a branched oligomer is selected to be used, a resin high in hardness and heat resistance can be obtained. It is also possible to mix the two types of oligomers to thereby appropriately adjust flexibility and hardness of the resin to be obtained.

Moreover, $A^3$ in formula (3) is an organic residue derived from dicarboxylic acid having at least one structure derived from dicarboxylic acid having alicyclic structure, aromatic ring structure and aliphatic chain structure. The definition and preferred compound examples thereof are the same as those of $A^2$ in formula (2).

X in formula (3) represents at least one organic residue derived from polyhydric alcohol.

Polyhydric alcohol is a compound having two or more hydroxyl groups, preferably two hydroxyl groups. X itself represents a skeleton part of polyhydric alcohol excluding hydroxyl groups.

Further, in polyhydric alcohol, since there need be at least two hydroxyl groups bonded thereto, in a case where there the polyhydric alcohol serving as raw material has a valence of 3 or more, that is, has three or more hydroxyl groups, some of the hydroxyl groups may remain unreacted.

Examples of polyhydric alcohol include ethylene glycol, propylene glycol, 1,3-propanediol, 1,4-butanediol, 1,3-butanediol, 1,5-pentanediol, neopentyl glycol, 1,6-hexanediol, 1,4-cyclohexane dimethanol, diethylene glycol, ethylene oxide adduct of isocyanuric acid, pentaerythritol, tricyclodecane dimethanol, glycerin, trimethylol propane, ethylene oxide adduct of pentaerythritol, D-sorbitol and hydrogenated bisphenol A. There is no limitation on production methods of these compounds.

As for the structural unit in the allyl ester oligomer represented by formula (3), the same structural unit may be repeated or different structural units may be contained. In other words, allyl ester oligomer may be of copolymer type. In this case, several kinds of X are present in a single allyl ester oligomer. For example, the structure may be such that one X is a residue derived from propylene glycol and another X is a residue derived from trimethylol propane. In this case, allyl ester oligomer is branched at sites of trimethylol propane residues. Similarly, several types of $A^3$ may be present. Shown below is a structural formula example in a case $R^3$ is an allyl group, $A^2$ and $A^3$ are residues derived from isophthalic acid and Xs are a propylene glycol and a trimethylol propane.

(4)

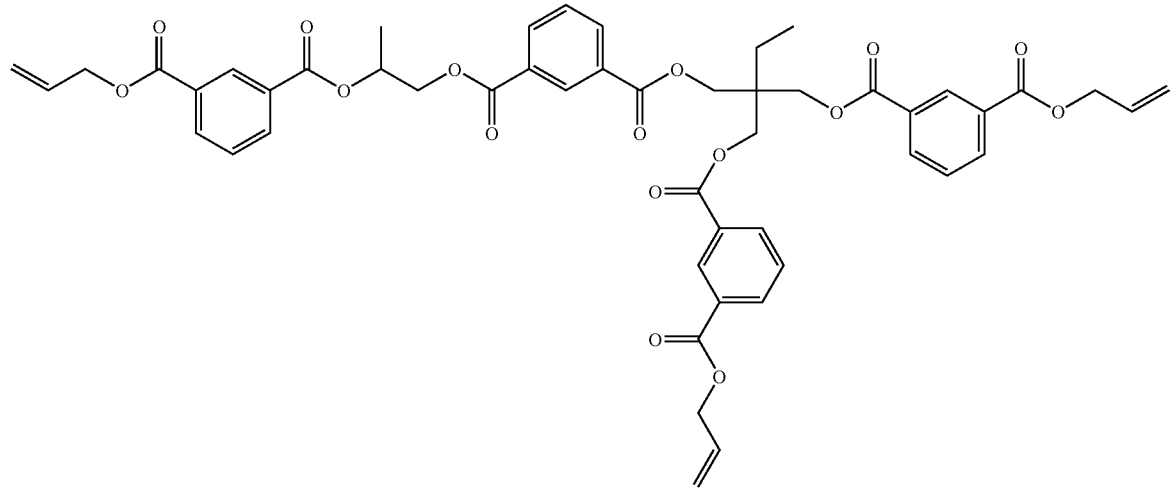

[Curing Agent]

In allyl ester resin composition of the present invention, curing agent may be used. There is no particular limitation on the curing agent usable. Those widely used as curing agent for polymerizable resin can be employed. Among them, in light of polymerization initiation of allyl group, it is preferred to add a radical polymerization initiator. Examples of radical polymerization initiator include organic peroxide, photopolymerization initiator and azo compound. Particularly preferred among these, in light of heat-curing the allyl ester resin composition of the present invention, is organic peroxide.

Examples of organic peroxide used in the invention include known ones such as dialkyl peroxide, acyl peroxide, hydroperoxide, ketone peroxide and peroxyester. Specific examples thereof include diisobutyryl peroxide, cumylperoxy neodecanoate, di-n-propylperoxy dicarbonate, diisopropyl peroxydicarbonate, di-sec-butylperoxy dicarbonate, 1,1,3,3-tetramethylbutyl peroxyneodecanoate, di(4-t-butylcyclohexyl)peroxy dicarbonate, di(2-ethylhexyl)peroxy dicarbonate, t-hexyl peroxy neodecanpate, t-butylperoxy neodecanoate, t-butyl peroxy neoheptanoate, t-hexylperoxy pivalate, t-butylperoxy pivalate, di(3,5,5-trimethylhexanoyl peroxide, dilauroyl peroxide, 1,1,3,3-tetramethylbutyl peroxy 2-ethylhexanoate, disuccinic acid peroxide, 2,5-dimethyl-2,5-di(2-ethylhexanoylperoxy)hexane, t-hexylperoxy 2-ethylhexanoate, di(4-methylbenzoyl)peroxide, t-butylperoxy 2-ethylhexanoate, di(3-methylbenzoyl)peroxide, benzoyl(3-methylbenzoyl)peroxide, dibenzoylperoxide, 1,1-di(t-butylperoxy)-2-methylcyclohexane, 1,1-di(t-hexylperoxy)-3,3,5-trimethylcyclohexane, 1,1-di(t-butylperoxy)cyclohexane, 1,1-di(t-butylperoxy) cyclohexane, 2,2-bis[4,4-di(t-butylperoxy)cyclohexyl] propane, t-hexylperoxy isopropyl monocarbonate, t-butylperoxy maleic acid, t-butylperoxy 3,5,5-trimethyl hexanoate, t-butylperoxy laurate, t-butylperoxy isopropyl monocarbonate, t-butylperoxy-2-ethylhexyl monocarbonate, t-hexylperoxybenzoate, 2,5-dimethyl-2,5-di(benzoylperoxy) hexane, t-butylperoxyacetate, 2,2-di(t-butylperoxy)butane, t-butylperoxybenzoate, n-butyl 4,4-di(t-butylperoxy)valerate, di(t-butylperoxy isopropyl)benzene, dicumylperoxide, di(t-hexyl)peroxide, 2,5-dimethyl-2,5-di(t-butylperoxy)hexane, t-butylcumyl peroxide, di-t-butylperoxide, p-menthane hydroperoxide, 2,5-dimethyl-2,5-di(t-butylperoxy)hexyne-3, diisopropylbenzene hydroperoxide, 1,1,3,3-tetramethylbutyl hydroperoxide, cumenehydroperoxide, t-butylhydroperoxide and 2,3-dimethyl-2,3-diphenylbutane.

Examples of the above photopolymerization initiator include 2,2-dimethoxy-1,2-diphenylethane-1-one, 1-hydroxycyclohexylphenylketone, benzophenone, 2-methyl-1-(4-methylthiophenyl)-2-morpholinopropane-1-one, 2-benzyl-2-dimethylamino-1-(4-morpholinophenyl)-butanone-1, 2-hydroxyl-2-methyl-1-phenylpropane-1-one, 1-[4-(2-hydroxylethoxy)-phenyl]-2-hydroxyl-2-one, 2-hydroxyl-1-{4-[4-(2-hydroxyl-2-methylpropionyl)benzyl]phenyl}-2-methylpropanel-one, oxyphenyl acetic acid 2-[2-oxo-2-phenylacetoxyethoxy]ethyl ester, oxyphenyl acetic acid 2-[2-hydroxylethoxy]ethyl ester, phenyl glyoxylic acid methyl ester, 2-dimethylamino-2-(4-methylbenzyl)-1-(4-morpholine-4-yl phenyl)butane-1-one, bis(2,4,6-trimethylbenzoyl) phenyl phosphine oxide, 1,2-octanedione, 1-[4-(phenylthio) phenyl-2-(O-benzoyloxime)], ethanone, 1-[9-ethyl-6-(2-methylbenzoyl)-9H-carbazol-3-yl]-1-(O-acetyloxime), iodonium, (4-methylphenyl)[4-(2-methylpropyl)phenyl] hexafluorophosphate(1-), ethyl-4-dimethylamino benzoate, 2-ethylhexyl-4-dimethylamino benzoate and 2,4,6-trimethylbenzoyl diphenylphosphine oxide.

One of these radical polymerization initiators may be used singly or two or more of them may be used in combination or in mixture.

There is no particular limitation on the blending amount of the curing agent. It is preferable that the amount be from 0.1 to 10 mass parts, more preferably from 0.5 to 5 mass parts, based on 100 mass parts of the allyl ester resin composition. If the amount of the curing agent is less than 0.1 mass parts, it is difficult to obtain a sufficient curing rate. If the amount exceeds 10 mass parts, the final cured product becomes fragile, resulting in reducing mechanical strength.

[Reactive Monomer]

To the allyl ester resin composition of the present invention, reactive monomer (reactive diluent) may be added for the purpose of controlling curing reaction rate, adjusting viscosity (improving workability), enhancing crosslinking density, adding functions and the like.

There is no particular limitation on the reactive monomer and various types may be used. In order to react with allyl ester oligomer, monomer having a radical polymerizable carbon-carbon double bond, such as vinyl group and allyl group, is preferred. Examples thereof include unsaturated fatty acid ester, aromatic vinyl compound, vinyl ester and derivative thereof of saturated fatty acid or aromatic carboxylic acid and crosslinkable polyfunctional monomer. Among them, by using crosslinkable polyfunctional monomer, crosslinking density of the cured product can be controlled. Preferred examples of the reactive monomer are described below.

Examples of unsaturated fatty acid ester include alkyl (meth)acrylates such as methyl(meth)acrylate, ethyl(meth)acrylate, butyl(meth)acrylate, 2-ethylhexyl(meth)acrylate, octyl(meth)acrylate, dodecyl(meth)acrylate, octadecyl (meth)acrylate, cyclohexyl(meth)acrylate and methyl cyclohexyl(meth)acrylate;

(Meth)acrylic acid aromatic esters such as phenyl(meth) acrylate, benzyl(meth)acrylate, 1-naphthyl(meth)acrylate, fluorophenyl(meth)acrylate, chlorophenyl(meth)acrylate, cyanophenyl(meth)acrylate, methoxyphenyl(meth)acrylate and biphenyl(meth)acrylate;

haloalkyl(meth)acrylates such as fluoromethyl (meth) acrylate and chloromethyl(meth)acrylate;

glycidyl(meth)acrylate, alkylamino (meth)acrylate and α-cyanoacrylic acid ester.

Examples of other vinyl compound include styrene, α-methyl styrene, chlorostyrene, styrene sulfonic acid, 4-hydroxy styrene, vinyl toluene, vinyl acetate, vinyl propionate, vinyl benzoate, N-vinyl formamide, N-vinyl acetamide, N-vinyl caprolactum, N-vinyl pyrrolidone, 1-vinyl imidazole, N-vinyl carbazol, N-vinyl morpholine, N-vinyl pyridine, acrylamide and acryloyl morpholine.

Examples of crosslinkable polyfunctional monomer include di(meth)acrylates such as ethyleneglycol di(meth) acrylate, diethyleneglycol di(meth)acrylate, triethyleneglycol di(meth)acrylate, tetraethyleneglycol di(meth)acrylate, propyleneglycol di(meth)acrylate, dipropyleneglycol di(meth)acrylate, tripropyleneglycol di(meth)acrylate, 1,3-butyleneglycol di(meth)acrylate, 1,4-butanediol di(meth) acrylate, 1,5-pentanediol di(meth)acrylate, 1,6-hexanediol di(meth)acrylate, neopentylglycol di(meth)acrylate, oligoester di(meth)acrylate, polybutadiene di(meth)acrylate, 2,2-bis(4-(meth)acryloyloxyphenyl)propane and 2,2-bis(4-(ω-(meth)acryloyloxypolyethoxy)phenyl)propane; diallyl of aromatic carboxylate such as diallyl phthalate, diallyl isophthalate, dimethallyl isophthalate, diallyl terephthalate, triallyl trimellitate, diallyl 2,6-naphtalene dicarboxylate, diallyl 1,5-naphtalene dicarboxylate, allyl 1,4-xylene dicarboxylate and diallyl 4,4'-diphenyl dicarboxylate; bifunctional crosslinkable monomers such as diallyl cyclohexane dicarboxylate and divinyl benzene; trifunctional crosslinkable monomers such as trimethylol ethane tri(meth)acrylate, trimethylol propane tri(meth)acrylate, pentaerythritol tri(meth)acrylate, tri (meth)allyl isocyanurate, tri(meth)allyl cyanurate, triallyl trimellitate and diallyl chlorendate; and tetrafunctional crosslinkable monomers such as pentaerythritol tetra(meth) acrylate.

One of the above reactive monomer may be used singly or two or more of them may be used in mixture or in combination. There is no particular limitation on the use amount of the resin component of the reactive monomer. It is preferable that the amount be from 1 to 1000 mass parts, more preferably from 2 to 500 mass parts, particularly preferably from 5 to 100 mass parts, based on 100 mass parts of the allyl ester oligomer. If the use amount of the reactive monomer is less than 1 mass parts, effect of reducing viscosity is small, resulting in deterioration of workability and further, when a large amount of monofunctional monomer is used as reactive monomer, crosslinking density becomes low, resulting in insufficient heat resistance, which is not preferred. In contrast, if the amount exceeds 1000 mass parts, excellent transparency inherent in allyl ester resin cannot be exhibited or mechanical strength derived from allyl ester resin is deteriorated in some cases, which is not preferred.

[Radically-reactive Resin Component]

The allyl ester resin composition of the present invention may contain radically-reactive resin components for the purpose of improving various properties. Examples of such a resin component include unsaturated polyester resin and vinylester resin.

Unsaturated polyester resin is obtained from a condensation product of esterification reaction between polyhydric alcohol and unsaturated polybasic acid (and if necessary, saturated polybasic acid), if necessary by dissolving it in polymerizable unsaturated compound such as styrene. For example, examples include resins described in "Polyester Resin Handbook", published by THE NIKKAN KOGYO SHIMBUN, LTD., 1988, pages 16-18 and 29-37. These unsaturated polyester resins can be prepared by known methods.

Vinyl ester resin is also called "epoxy(meth) acrylate" and generally, means a resin having a polymerizable unsaturated group generated through ring-opening reaction between a compound having an epoxy group such as epoxy resin and a carboxyl compound having a polymerizable unsaturated group such as (meth)acrylic acid or a resin having a polymerizable unsaturated group generated through ring-opening reaction between a compound having a carboxyl group and an epoxy group of a polymerizable unsaturated compound having an epoxy group in its molecule such as glycidyl(meth) acrylate. Specifically, such resins are described in "Polyester Resin Handbook", published by THE NIKKAN KOGYO SHIMBUN, LTD., 1988, pages 336-357 and the vinyl ester resins can be produced by known methods.

Examples of epoxy resin used as raw material for vinyl ester resin include bisphenol A diglycidyl ether and high molecular weight homologues thereof, glycidyl ether of bisphenol A alkylene oxide adduct, bisphenol F diglycidyl ether and high molecular weight homologues thereof, glycidyl ether of bisphenol F alkylene oxide adduct and novolak-type polyglycidyl ether.

One of the above radically-reactive resin components may be used singly or two or more of them may be used in mixture or in combination.

There is no particular limitation on the use amount of the radically-reactive resin component. It is preferable that the amount be in a range of 1 to 1000 mass parts, more preferably from 2 to 500 mass parts, particularly preferably from 5 to 100 mass parts, based on 100 mass parts of the allyl ester oligomer.

If the amount of the radically-reactive resin component is less than 1 mass parts, effect of improving mechanical strength, which is derived from the radically-reactive resin component, is small, resulting in deteriorating workability or moldability, which is not preferred. If the amount exceeds 1000 mass parts, heat resistance of the allyl ester resin may not be obtained in some cases, which is not preferred.

[Additives]

In the allyl ester resin composition for transparent electroconductive substrate of the present invention, additives such as ultraviolet absorber, antioxidant, defoaming agent, leveling agent, mold release agent, lubricant, water repellant, flame retardant, shrinkage reducing agent and crosslinking aid may be added when necessary, for the purpose of improving hardness, strength, moldability, durability and water resistance.

There is no particular limitation on the antioxidant and those generally used may be employed. Preferred among them are phenol-based antioxidant and amine-based antioxidant which are radical chain inhibitors, most preferred is phenol-based antioxidant. Examples of phenol-based antioxidant include 2,6-t-butyl-p-cresol, 2,6-t-butyl-4-ethylphenol, 2,2'-methylenebis(4-methyl-6-t-butylphenol) and 1,1,3-tris(2-methyl-4-hydroxy-5-t-butylphenyl)butane.

There is no particular limitation on the lubricant and those generally used may be employed. Preferred among them are metal soap lubricant, fatty acid ester lubricant and aliphatic hydrocarbon lubricant and most preferred is metal soap lubricant. Examples of metal soap lubricant include barium stearate, calcium stearate, zinc stearate, magnesium stearate and aluminum stearate. These may be used in form of a complex.

There is no particular limitation on the ultraviolet absorber and those generally used may be employed. Preferred among them are benzophenone-based ultraviolet absorber, benzotriazole-based ultraviolet absorber and cyanoacrylate-based ultraviolet absorber, and most preferred is benzophenone-based ultraviolet absorber. Examples of benzophenone ultraviolet absorber include 2-(2'-hydroxy-5'-methylphenyl)benzotriazole, 2-(2'-hydroxy-5'-butylphenyl)benzotriazole and 2-(2-hydroxy-3'-tert-butylphenyl)benzotriazole.

However, these additives are not limited to these specific examples and within an extent that does not inhibit the objective and effects of the present invention, various additives may be added.

[Cured Product of Allyl Ester Resin]

The allyl ester resin composition can be obtained by mixing the allyl ester oligomer, the reactive monomer, the curing agent and various additives as afore-mentioned together by a known method. The composition can be cured by known methods such as coating using roll-coater or spin coater, casting and photo-fabrication with heat, UV ray or electron beam after dispersing tabular inorganic substance therein.

The curing temperature at the time of molding the allyl ester resin composition having tabular inorganic substance dispersed therein to be the transparent composite material of the present invention through heat curing is within a range of about 30 to 160° C., preferably 40 to 130° C.

Moreover, in consideration for shrinkage and distortion generated during the curing, it is preferred that the curing be conducted with the temperature being gradually increased and generally the curing is conducted over 0.5 to 100 hours, preferably 3 to 50 hours, more preferably 10 to 30 hours.

The curing temperature at the time of curing the allyl ester resin composition having tabular inorganic substance dispersed therein to be the transparent composite material of the present invention through UV irradiation is within a range of about 0 to 150° C., preferably 10 to 130° C. Moreover, it is preferred that the curing be conducted over 0.01 to 10 hours, preferably 0.05 to 1 hours, more preferably 0.1 to 0.5 hours. The accumulated UV light amount is within a range of 10 to 5000 mJ/cm$^2$. If the light amount is less than 10 mJ/cm$^2$, curing ends up as incomplete, which is not preferred. If the light amount exceeds 5000 mJ/cm², productivity is deteriorated.

In a case where the allyl ester resin composition of the present invention is cured by electron beam irradiation, polymerization initiator is not required but for the purpose of ensuring completeness of curing by post-curing treatment, polymerization initiator may be used.

The accelerating voltage of electron beam in case of electron beam irradiation is in a range of 30 to 500 kV, preferably 50 to 300 kV. The irradiation amount is in a range of 1 to 300 kGy, preferably 5 to 200 kGy. If the accelerating voltage of electron beam is less than 30 kV, transmission of the electron beam may become insufficient when the composition thickness is large while the voltage exceeding 500 kV is economically inefficient. If the irradiation amount exceeds 300 kGy, sometimes base materials may be damaged, which is not preferred.

[Crosslinkable Acrylic Resin Composition]

Crosslinkable acrylic resin composition is a resin composition containing a compound having two or more (meth)acryloyloxy groups or a cured product thereof.

If necessary, the composition may contain a compound having one (meth)acryloyloxy group as a reactive monomer.

In addition, the composition may contain curing agent and various additives as described in case of the allyl ester resin composition. The term "(meth) acryl" means "acryl" or "methacryl".

Preferred as the compound having two or more (meth) acryloyloxy grous is polyester compound of (meth)acylic acid. Examples thereof include ethyleneglycol di(meth)acrylate, diethylene glycol di(meth)acrylate, triethyleneglycol di(meth)acrylate, tetraethyleneglycol di(meth)acrylate, polyethyleneglycol di(meth)acrylate, tripropyleneglycol di(meth) acrylate, 1,3-butyleneglycol di(meth)acrylate, 1,4-butanediol di(meth)acrylate, 1,5-pentadioldi(meth)acrylate, 1,6-hexadiol di(meth)acrylate, neopentyl glycoldi(meth)acrylate, oligoester di(meth)acrylate, polybutadiene di(meth)acrylate, 2,2-bis(4-(meth)acryloyloxyphenyl)propane and 2,2-bis(4-ω-(meth)acryloyloxy pyriethoxy)phenyl)propane, neopentylglycol di(meth)acrylate, glycerine di(meth)acrylate, trimethylolethane tri(meth)acrylate, trimethylolpropane tri (meth)acrylate, pentaerythritol di(meth)acrylate, pentaerythritol tri(meth)acrylate, pentaerythritol tetra(meth) acrylate, dipentaerythritol hexa(meth)acrylate, bisphenol A di(meth)acrylate, bisphenol S diacrylate, dicyclopentadienyl di(meth)acrylate, tricyclodecane dimethanol di(meth)acrylate and tris(2-hydroxyethyl)isocyanurate tri(meth)acrylate.

Examples of compound having one (meth)acryloyloxy group as a reactive monomer include methyl(meth)acrylate, ethyl(meth)acrylate and 2-hydroxyethyl(meth)acrylate. Also, a compound having one radically-polymerizable carbon-carbon double bond such as styrene may be used. Besides, the reactive monomers described above in relation to the allyl ester resin composition may be used.

Also in case of crosslinkable acrylic resin composition, the curing agents, reactive monomers, additives and others described in relation to the allyl ester resin composition may be used.

[Solvent]

In curing the three-dimensionally crosslinkable resin composition of the present invention, solvent may be used in a case where viscosity needs to be reduced at the time of molding a product. However, since such a solvent needs to be removed at a later stage, it is preferable to adjust the viscosity by using the afore-mentioned reactive monomer.

Examples of solvent usable to adjust viscosity include aromatic hydrocarbons such as benzene, toluene, xylene, ethyl benzene, mesitylene, n-propyl benzene and isopropyl benzene, acetic acid esters such as methyl acetate, ethyl acetate, propyl acetate and butyl acetate, ketones such as acetone, methyl ethyl ketone and methyl isobutyl ketone, ethers such as tetrahydrofuran, 1,4-dioxane, alcohols such as ethyl alcohol, (iso)propyl alcohol and butyl alcohol, and nitrogen-containing solvents such as dimethyl formamide, N-methyl pyrrolidone, N-vinyl pyrrolidone and pyridine.

In a case where the tabular inorganic substance is an inorganic lamellar compound, it is preferable to use a solvent capable of swelling or cleaving the inorganic lamellar compound. By swelling or cleaving the inorganic lamellar compound, the inorganic lamellar compound becomes flake-like crystals having a planar shape with a large aspect ratio. In order to promote swelling or cleaving, it is preferable to use layered silicate in which is intercalated with cationic surfactant or the like between crystal layers as afore-mentioned.

Examples of solvent capable of swelling or cleaving the inorganic lamellar compound include wa-ter, alcohols such as methanol, dimethylformamide, dimethyl sulfoxide, dichloromethane, chloroform, benzene, toluene, xylene, mesitylene, n-propyl benzene, isopropyl benzene, acetone, methyl ethyl ketone, methyl isobutyl ketone, N-methylpyrrolidone, N-vinyl pyrrolidone and pyridine. Preferred among these are water, alcohols such as methanol, toluene, xylene and N-methylpyrrolidone, in light of handleability.

The ratio of the solvent against the inorganic lamellar compound largely depends on the type of the solvent. Generally the amount is within a range of 100 to 10000 mass parts, more preferably 200 to 5000 mass parts, based on 100 mass parts of the inorganic lamellar compound. If the ratio of the solvent is less than 100 mass parts, viscosity of the mixture composition solution is increased, resulting in difficulty in coating process.

If the ratio exceeds 10000 mass parts, viscosity of the mixture composition solution is decreased, resulting in difficulty in obtaining a desired film thickness.

[Viscosity of Three-dimensionally Crosslinkable Resin Composition]

The viscosity of the three-dimensionally crosslinkable resin composition can be measured by a method according to JIS K6901.

There is no particular limitation on viscosity of the three-dimensionally crosslinkable resin composition for transparent material of the present invention. It is preferable that the viscosity be suitable for the molding method employed.

For example, in cast-molding method, it is preferable that the viscosity at 25° C. be within a range of 0.01 to 1000 Pa·s. The viscosity of less than 0.01 Pa·s or exceeding 1000 Pa·s deteriorates workability, which is not preferred.

In transfer molding method, it is preferable that the viscosity at 80° C. be within a range of 0.01 to 1000 Pa·s. The viscosity at 80° C. of less than 0.01 Pa·s or exceeding 1000 Pa·s may lead to defective molding, which is not preferred.

In a case where roll-coating method or doctor-blade method is employed, it is preferable that viscosity at 25° C. be within a range of 0.01 to 1000 Pa·s. The viscosity of less than 0.01 Pa·s or exceeding 1000 Pa·s deteriorates workability, which is not preferred. In a case where viscosity is high at room temperature, workability can be enhanced by increasing the temperature.

[Production Method of Transparent Film/Sheet/Plate]

Next, production method of transparent film, transparent sheet and transparent plate is described. Hereinbelow, the transparent film, transparent sheet and transparent plate are sometimes referred to as "transparent substrate of the present invention".

By evaporation-coating of electroconductive thin film on the surface of the transparent substrate of the present invention, transparent electrocondictive substrate can be produced. Further, antireflection coating film may be provided on the surface.

The transparent substrate according to the present invention can be produced by applying a mixture of tabular inorganic substance having a number-average particle size of 10 to 300 nm and an aspect ratio of 10 to 300 and a three-dimensionally crosslinkable resin composition on a plate to be coated, drying, curing and peeling off the obtained film.

In a case where the tabular inorganic substance is inorganic lamellar compound, a mixture of the inorganic lamellar compound, a three-dimensionally crosslinkable resin composition and solvent can be prepared, for example, by a method of mixing a liquid containing resin component dissolved in solvent with a dispersion liquid containing the inorganic lamellar compound swelled or cleaved in solvent, a method where resin component is added to and dissolved in a dispersion liquid having the inorganic lamellar compound swelled or cleaved in solvent, a method of adding inorganic lamellar compound to a liquid containing resin component dissolved therein to swell or cleave the compound, or a method of heat kneading resin component and inorganic lamellar compound and dissolving the resultant in solvent to disperse it therein. The former three are preferred. Among them, in light of dispersibility of inorganic lamellar compound, the method of mixing a liquid containing resin component dissolved in solvent with a dispersion liquid containing the inorganic lamellar compound swelled or cleaved in solvent is the most preferred.

Next, the mixture of an inorganic lamellar compound used as tabular inorganic substance, resin component and solvent is applied onto a substrate to be coated, and dried to obtain a resin film containing the inorganic lamellar compound dispersed therein. After heat-curing or photo-curing it, the film is peeled off from the substrate to thereby obtain a film, sheet or plate. When a flexible resin substrate is used as the substrate to be coated, the film formed on the substrate needs not be peeled off and the entirety (including the coated substrate) may be employed as a transparent substrate.

Application is carried out by direct gravure method, reverse gravure method, microgravure method, roll-coating methods such as two-roll beat coating method and bottom feed three-roll reverse coating, doctor-blade method, die coating method, dip coating method, bar coating method, a combination method thereof or the like, as generally employed in the industry, with the mixture solution used as coating solution and with glass, metal, resin film or the like used as the substrate to be coated. The subsequent drying step can be carried out by reduced-pressure drying, hot-air drying, infrared drying or the like, as generally employed in the industry.

Among them, in order to orient the tabular inorganic substance in the planer direction, roll coating method and doctor-blade coating where shear force is applied onto the direction parallel to the substrate surface are preferred.

A transparent substrate consisting of two or more layers can be produced by a method where a procedure of first applying a layer onto a substrate to be coated, drying and then applying the next layer onto the obtained layer film is repeated and peeling off the resultant laminate peeled off from the substrate or a method of preparing two or more films and laminating the films. In a case where two or more films are laminated, interface(s) between the two (or more) films may be subjected to corona treatment or anchor coating treatment.

It is preferable that the tabular inorganic substance be substantially oriented in the planar direction of the transparent substrate. That is, it is preferable that most of tabular inorganic substance particles be oriented such that the largest surface of each particle is roughly parallel to the surface of the substrate (here, this state is called "oriented in the planar direction"). When the tabular inorganic substance is oriented in a planar direction, the coefficient of thermal expansion of the transparent substrate in the planar direction can be effectively suppressed, resulting in markedly low coefficient of thermal expansion. Further, by orienting the tabular inorganic substance in the planar direction, even if the amount of the tabular inorganic substance contained is large, transmittance of visible light rays can be enhanced.

In a case where a vaporizable solvent is used to dilute the tabular inorganic substance and resin component, the tabular inorganic substance can be more oriented. That is, after applying a mixture of the tabular inorganic substance, resin component and solvent onto a substrate to be coated, if only solvent is vaporized, the composition for the transparent substrate can contract in the normal-line direction while the length and the width of the composition remain unchanged. As a result, tabular inorganic substance remaining in the resin is oriented in the planar direction. In a case where a reactive monomer is used, a fine balance can be established between costs for removing solvent and orientation of the tabular inorganic substance by selecting reactive monomer(s) with relatively low vapor pressure in combination with normal solvent with high vapor pressure to thereby allow the solvent to evaporate at an appropriate temperature.

In the method of orienting the tabular inorganic substance in the planar direction by allowing the solvent to vaporize, the above described roll coating method and doctor-blade method can of course be used in combination and also, can be carried out only through coating without applying shear force.

Preferred temperature for allowing the solvent to vaporize is within a range of 0 to 200° C. If the temperature is lower than 0° C., vaporization speed becomes remarkably slow, which is not preferred. If the temperature exceeding 200° C., bubbles are generated or resin is gelated to deteriorate smoothness of the film, which is not preferred. More preferred temperature is within a range of 10 to 100° C.

Preferred pressure for allowing the solvent to vaporize is within a range of 1 Pa to 1 MPa. If the pressure is less than 1 Pa, bumping may occur. If the pressure is higher than 1 MPa, vaporization speed becomes remarkably slow, which is not preferred. More preferred pressure is within a range of 10 Pa to 0.2 MPa.

Preferred time period for allowing the solvent to vaporize is within a range of 1 to 120 minutes. If it is less than 1 minute, vaporization may become insufficient, which is not preferred. If it exceeds 120 minutes, productivity is deteriorated, which is not preferred.

In allowing the solvent to vaporize, gasses such as nitrogen, argon, air and carbon dioxide may be used. Further, such a gas may contain component vaporized from the solvent.

Preferred flow rate of the gas in allowing the solvent to vaporize is within a range of 0.01 to 100 m/s. If the rate is less than 0.01 m/s, the gas component vaporized from the solvent remains stagnant, which is not preferred. If the rate exceeds 100 m/s, the coating solution becomes inhomogeneous, which is not preferred. More preferred rate is from 0.1 to 50 m/s.

Specific examples of method for producing transparent plates, transparent films and transparent sheets include a method of after spreading a three-dimensionally crosslinkable resin composition containing solvent and tabular inorganic substance dispersed therein onto a smooth planar surface, for example, a biaxial stretched polyethylene terephthalate film by the above described method, allowing the solvent to evaporate and then sandwiching between smooth-surface biaxial stretched polyethylene terephthalate films to thereby cure it.

[Coefficient of Thermal Expansion]

The transparent substrate using the transparent composite material of the present invention comprises at least one resin layer containing a specific tabular inorganic substance. By containing a specific amount of specific tabular inorganic substance, the coefficient of thermal expansion of the transparent substrate of the present invention bocomes small. Preferred average coefficient of thermal expansion of the transparent substrate of the present invention is 50 ppm/° C. or less at a temperature range of 50 to 150° C., more preferably 20 ppm/° C. or less.

Here, the "average coefficient of thermal expansion" is a value measured by the extension mode of TMA method which is analogous to JIS K-7197.

EXAMPLES

Hereinafter, the present invention will be explained in more detail below with reference to Examples and Comparative Examples, but the present invention is not limited thereto.

[Measurement of Coefficient of Thermal Expansion and Tg]

The coefficient of thermal expansion was measured by using a thermoanalyzer (TMA-50) manufactured by Shimadzu Corporation under tensile loading. The size of a film-type test piece subjected to the measurement was 50 μm (thickness)×3 mm×12 mm (a chuck distance of 10 mm), and the tension at the measurement was 0.001 kgf. Elongation rate of the test piece was measured at temperature increase rate of 5° C./minute from 30 to 300° C. under 50 mL/min of nitrogen atmosphere after temperature had been once increased at rate of 5° C./minute to 300° C. and then cooled down to 30° C. Average coefficient of thermal expansion between 50° C. and 150° C. in a planar direction was calculated from a difference in elongation rates between 50° C. and 150° C. and a temperature difference (100° C.). Also, a temperature at the discontinuity point of the elongation rate was considered as glass transition temperature (Tg).

[Total Light Transmittance]

The total light transmittance was determined according to JIS K7361-1 by using NDH-2000 manufactured by Nippon Denshoku Industries Co., Ltd.

[Haze]

The haze value was determined according to JIS K7136 by using NDH-2000 manufactured by Nippon Denshoku Industries Co., Ltd.

Synthesis Example 1

In a 2L-volume three-neck flask equipped with a distillation unit, 1625 g of diallyl 1,4-cyclohexane dicarboxylate, 327 g of propylene glycol and 0.813 g of dibutyl tin oxide were placed. The mixture was heated under nitrogen stream while distilling off generated allylalcohol at 180° C. At the time point when the amount of the distilled allylalcohol reached about 350 g, the inside of the reaction system was depressurized gradually to 6.6 kPa (over about 4 hours) to accelerate the distillation rate of alcohol. At the time point when almost no distilled liquid coming out was observed, the inside of the reaction system was depressurized to 0.5 kPa and reaction was continued for another 1 hour. Then the reaction product was cooled down. Hereinafter, the thus obtained reaction product is called "oligomer (1)".

Synthesis Example 2

In a 2L-volume three-neck flask equipped with a distillation unit, 1400 g of diallyl 1,4-cyclohexanedicarboxylate, 165.4 g of trimethylolpropane and 1.40 g of dibutyl tin oxide were placed. The mixture was heated under nitrogen stream while distilling off generated alcohol at 180° C. At the time point when the amount of the distilled alcohol became about 150 g, the inside of the reaction system was depressurized gradually to 6.6 kPa over about 4 hours to accelerate the distillation rate of alcohol. At the time point when almost no distilled liquid coming out was observed, the inside of the reaction system was depressurized to 0.5 kPa and reaction was continued for another 1 hour. Then the reaction product was cooled down. Hereinafter, the thus obtained reaction product is called "oligomer (2)".

Synthesis Example 3

In a 2L-volume three-neck flask equipped with a distillation unit, 1625 g of diallyl terephthalate, 167 g of propylene glycol and 0.813 g of dibutyl tin oxide were placed. The mixture was heated under nitrogen stream while distilling off generated alcohol at 180° C. At the time point when the amount of the distilled alcohol reached about 170 g, the inside of the reaction system was depressurized gradually to 6.6 kPa over about 4 hours to accelerate the distillation rate of alcohol. At the time point when almost no distilled liquid coming out was observed, the inside of the reaction system was depressurized to 0.5 kPa and reaction was continued for another 1 hour. Then the reaction product was cooled down. Hereinafter, the thus obtained reaction product is called "oligomer (3)".

Example 1

In a 200 mL-volume beaker, 90 g of toluene was placed and 10 g of oleophilic smectite (manufactured by Co-op Chemical Co., Ltd., product name; STN (synthetic smectite), number-average particle size; 50 nm, aspect ratio; 50, inorganic constituent; 70%), which had been subjected to cation-exchange treatment by trioctyl methyl ammonium salt, was placed in the beaker little by little while stirring with a stirrer. After sufficiently stirring with a stirrer for 2 days at room temperature, a dispersion liquid of smectite was obtained.

To the dispersion liquid of smectite described above, 10 g of oligomer (1) and 0.30 g of radical polymerization initiator (product name: Perhexa TMH; manufactured by NOF CORPORATION) were added and stirred completely, to thereby obtain a composition.

The obtained composition was applied on a polyethylene terephthalate film by using a bar-coater such that the film thickness after cured could be 50 μm. Then, the coated film was dried at 50° C. for 1 hour by a hot air drier to evaporate solvent toluene. Further, the coated film was covered with another polyethylene terephtalate film and the films were sandwiched between 2 glass plates. Curing was conducted at 80° C. for 1 hour, 100° C. for 1 hour and 120° C. for 1 hour. The polyethylene terephthalate films were removed to thereby prepare a sample film. The film had a coefficient of thermal expansion of 18 ppm/° C., a Tg of 300° C. or more (beyond a measurement limitation) and a total light transmittance of 91%. Also, when the film was rolled on a circular cylinder having a diameter of 10 cm, no crack and no whitening were observed and the film was extremely flexible.

Example 2

A sample film having a thickness of 50 μm was prepared in the same manner as in Example 1 except that 10 g of neopentylglycol dimethacrylate was used instead of 10 g of oligomer (1). The film had a coefficient of thermal expansion of 17 ppm/° C., a Tg of 300° C. or more (beyond a measurement limitation) and a total light transmittance of 92%.

Example 3

A sample film having a thickness of 50 μm was prepared in the same manner as in Example 1 except that 10 g of oligomer (3) was used instead of 10 g of oligomer (1). The film had a coefficient of thermal expansion of 20 ppm/° C., a Tg of 245° C. and a total light transmittance of 85%.

Example 4

In a 200 mL-volume beaker, 90 g of toluene was placed and 10 g of oleophilic smectite (manufactured by Co-op Chemical Co., Ltd., product name; STN (synthetic smectite)), which had been subjected to cation-exchange treatment by trioctyl methyl ammonium salt, was placed in the beaker little by little while stirring with a stirrer. After sufficiently stirring with a stirrer for 2 days at room temperature, a dispersion liquid of smectite was obtained.

To the dispersion liquid of smectite described above, 10 g of oligomer (1) and 0.50 g of radical polymerization initiator (product name: IRGACURE 651; manufactured by Ciba Specialty Chemicals) were added and stirred sufficiently to obtain a composition.

The obtained composition was applied on a high transparent polyethylene terephthalate film by using a bar-coater such that the film thickness after cured could be 50 μm. Then, the coated film was dried at 60° C. for 1 hour by a hot air drier to evaporate solvent toluene. Further, the coated film was covered with another high transparent polyethylene terephthalate film and the entirety was subjected to ultraviolet exposure of 3000 mj/cm² by using a UV exposure apparatus (product name: TOSCURE 401; manufactured by HARISON TOSHIBA LIGHTING Corp.). The composition film was separated from the polyethylene terephthalate films and subjected to post-curing treatment at 200° C. for 1 hour to thereby prepare a sample film. The film had a coefficient of thermal expansion of 18 ppm/° C., a Tg of 300° C. or more (beyond a measurement limitation) and a total light transmittance of 91%.

Example 5

A sample film having a thickness of 50 μm was prepared in the same manner as in Example 4 except that 7 g of oligomer (1) and 3 g of 1,6-hexanediol diacrylate was used instead of 10 g of oligomer (1) and that the exposure level of ultraviolet was 1000 mj/cm² instead of 3000 mj/cm². The film had a coefficient of thermal expansion of 30 ppm/° C., a Tg of 300° C. or more (beyond a measurement limitation) and a total light transmittance of 90%.

Example 6

A sample film having a thickness of 50 μm was prepared in the same manner as in Example 4 except that 10 g of tetraethylene glycol dimethacrylate was used instead of 10 g of oligomer (1) and that the exposure level of ultraviolet was 1000 mj/cm² instead of 3000 mj/cm². The film had a coefficient of thermal expansion of 17 ppm/° C., a Tg of 300° C. or more (beyond a measurement limitation) and a total light transmittance of 91%.

Example 7

To a smectite dispersion solution prepared in the same manner as in Example 1 were added 7 g of oligomer (1) and 3 g of 1,6-hexane diol diacrylate and the mixture was sufficiently stirred to thereby prepare a composition.

The obtained composition was applied on a high transparent polyethylene terephthalate film by using a bar-coater such that the film thickness after cured could be 100 μm. Then, the coated film was dried at 80° C. for 10 minutes by a hot air drier to evaporate solvent toluene. Further, the coated film was covered with another high transparent polyethylene terephthalate film and the entirety was subjected to electron beam irradiation of 200 kV and 100 kGy by using an electron beam irradiator (product name: EC250/15/180L; manufactured by IWASAKI ELECTRIC CO., LTD.). Then, the composition film was separated from the polyethylene terephthalate films and subjected to post-curing treatment at 200° C. for 1 hour to thereby prepare a sample film. The film had a coefficient of thermal expansion of 22 ppm/° C., a Tg of 300° C. or more (beyond a measurement limitation) and a total light transmittance of 90%.

Comparative Example 1

To 10 g of oligomer (1), 0.30 g of radical polymerization initiator (product name: Perhexa TMH; manufactured by NOF CORPORATION) was added and stirred sufficiently to obtain a composition.

The obtained composition was applied on a polyethylene terephthalate film by a barcoater such that the film thickness after cured could be 50 μm. Further, the coated film was covered with another polyethylene terephthalate film and the entirety was sandwiched between 2 glass plates. Curing was conducted at 80° C. for 1 hour, 100° C. for 1 hour and 120° C. for 1 hour. The polyethylene terephthalate films were removed to thereby prepare a sample film. The film had a coefficient of thermal expansion of 112 ppm/° C., a Tg of 70° C. and a total light transmittance of 92%.

Comparative Example 2

A sample film having a thickness of 50 μm was prepared in the same manner as in Comparative Example 1 except that oligomer (2) was used instead of oligomer (1). In Comparative Example 2, the product obtained was a cured product of a normal-type allyl ester resin. The film had a coefficient of thermal expansion of 115 ppm/° C., a Tg of 250° C. and a total light transmittance of 92%. The result was not preferable in that the coefficient of thermal expansion was high although the Tg value was high.

Comparative Example 3

A sample film having a thickness of 50 μm was prepared in the same manner as in Comparative Example 1 except that oligomer (3) was used instead of oligomer (1). In Comparative Example 3, the product obtained was a cured product of a normal-type allyl ester resin. The film had a coefficient of thermal expansion of 110 ppm/° C., a Tg of 248° C. and a total light transmittance of 90%. The result was not preferable in that the coefficient of thermal expansion was high although the Tg value was high.

Comparative Example 4

To 10 g of oligomer (1), 0.50 g of ultraviolet polymerization initiator (product name: IRGACURE 651; manufactured by Ciba Specialty Chemicals) was added and stirred sufficiently to obtain a composition.

The obtained composition was applied on a highly-transparent polyethylene terephthalate film having a thickness of 50 μm by using a bar-coater such that the film thickness after cured could be 50 μm. Further, the coated film was covered with another high transparent polyethylene terephthalate film and the entirety was subjected to ultraviolet exposure of 3000 mj/cm$^2$ by using a UV exposure apparatus (product name: TOSCURE 401; manufactured by HARISON TOSHIBA LIGHTING Corp.). The polyethylene terephthalate films were removed to thereby prepare a sample film. The film had a coefficient of thermal expansion of 112 ppm/° C., a Tg of 65° C. and a total light transmittance of 92%. The result was not preferable in that not only the Tg value was low but also the coefficient of thermal expansion was high.

tion, a transparent sheet or film, flexible and having a small thermal expansion coefficient can be provided and therefore, the present invention can be applied in the fields of flexible display devices, solar batteries and the like.

The invention claimed is:

1. A transparent composite material, comprising a cured product of a three-dimensionally crosslinkable resin composition containing tabular inorganic substance having a number-average particle size of 10 to 300 nm and an aspect ratio of 10 to 300 dispersed therein,
    wherein the three-dimensionally crosslinkable resin composition is a resin composition not containing an aromatic ring,
    wherein the average coefficient of thermal expansion in a planar direction at 50 to 150 ° C. is 50 ppm/° C. or less,
    and wherein the three-dimensionally crosslinkable resin composition is an allyl ester resin composition and/or crosslinkable acrylic resin composition.

2. The transparent composite material according to claim 1, wherein the amount of the tabular inorganic substance is within a range of 10 to 70 mass %.

3. The transparent composite material according to claim 1, wherein the allyl ester resin composition further contains reactive monomers.

TABLE 1

| | tabular inorganic substance | | coefficient of thermal expansion (ppm/° c.) | Tg (° c.) | total light transmittance (%) | haze (%) |
|---|---|---|---|---|---|---|
| | type | content of inorganic substance (mass %) | | | | |
| Example. 1 | smectite | 35 | 18 | 300 or more | 91 | 2 or less |
| Example. 2 | smectite | 35 | 17 | 300 or more | 92 | 2 or less |
| Example. 3 | smectite | 35 | 20 | 245 | 85 | 2 or less |
| Example. 4 | smectite | 35 | 18 | 300 or more | 91 | 2 or less |
| Example. 5 | smectite | 35 | 30 | 300 or more | 90 | 2 or less |
| Example. 6 | smectite | 35 | 17 | 300 or more | 91 | 2 or less |
| Example. 7 | smectite | 35 | 22 | 300 or more | 90 | 3 |
| Comparative Example 1 | none | 0 | 112 | 70 | 92 | 2 or less |
| Comparative Example 2 | none | 0 | 115 | 250 | 92 | 2 or less |
| Comparative Example 3 | none | 0 | 110 | 248 | 90 | 2 or less |
| Comparative Example 4 | none | 0 | 112 | 65 | 92 | 2 or less |

Substrates for display devices using conventional transparent composite materials have disadvantages that the difference in coefficient of thermal expansion between the substrate and a transparent electrode provided thereon is large and as the surrounding temperature changes, differences in thermal shrinkage between the substrate and the transparent electrode are generated, which causes cracks in the transparent electrode, resulting in increasing resistance and causing disconnection. The substrate for display devices, using transparent composite material having an extremely small coefficient of thermal expansion according to the present invention, can solve the above problem to provide highly-durable display devices and therefore, the present invention is extremely useful industrially. Moreover, according to the present inven- 4. The transparent composite material according to claim 1 having a total transmittance of 90% or higher.

5. The transparent composite material according to claim 1, wherein the allyl ester resin composition is a composition consisting essentially of an allyl ester compound having an ester structure formed from a polyhydric alcohol and dicarboxylic acid, with allyl group and/or methallyl group as terminal group, and a curing agent.

6. The transparent composite material according to claim 1, wherein the allyl ester resin composition is a composition consisting essentially of an allyl ester compound having an ester structure formed from polyhydric alcohol and dicarboxylic acid, with allyl group and/or methallyl group as terminal group, a curing agent and a reactive monomer.

7. The transparent composite material according to claim 1, wherein the allyl ester resin composition is a composition consisting essentially of an allyl ester compound having an ester structure formed from polyhydric alcohol and dicarboxylic acid, with allyl group and/or methallyl group as terminal group, a curing agent and radically reactive resin.

8. The transparent composite material according to claim 1, wherein the allyl ester resin composition is a composition consisting essentially of an allyl ester compound having an ester structure formed from polyhydric alcohol and dicarboxylic acid, with allyl group and/or methallyl group as terminal group, a curing agent, a reactive monomer and radically reactive resin.

9. The transparent composite material according to claim 1, wherein the tabular inorganic substance is inorganic lamellar compound.

10. The transparent composite material according to claim 9, wherein the inorganic lamellar compound is at least one kind selected from a group consisting of smectite, talc, kaolinite and mica.

11. The transparent composite material according to claim 9, wherein the inorganic lamellar compound is layered silicate hydrophobized by cation exchange method using cationic surfactant.

12. The transparent composite material according to claim 1, wherein the allyl ester resin composition is a composition containing an allyl ester compound having an ester structure formed from polyhydric alcohol and dicarboxylic acid, with allyl group and/or methallyl group as terminal group.

13. The transparent composite material according to claim 12, wherein the allyl ester resin composition further contains at least one compound selected from compounds represented by formula (1):

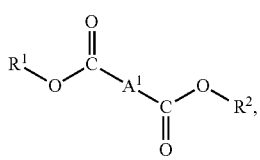

(1)

wherein $R^1$ and $R^2$ each independently represents allyl group or methallyl group, $A^1$ represents an organic residue derived from dicarboxylic acid having at least one structure of alicyclic structure and aliphatic chain structure.

14. The transparent composite material according to claim 13, wherein the dicarboxylic acid in formula (1) is dicarboxylic acid having alicyclic structure.

15. The transparent composite material according to claim 14, wherein the dicarboxylic acid having alicyclic structure is 1,4-cyclohexane dicarboxylic acid.

16. The transparent composite material according to claim 12, wherein at least one kind of the allyl ester compound has a group represented by formula (2) as terminal group and has a structure represented by formula (3) as a constituent unit, wherein formula (2) is represented by the structure:

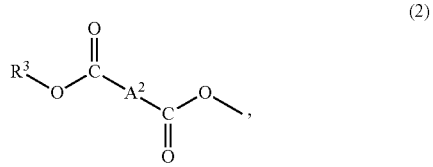

(2)

wherein $R^3$ represents an allyl group or a methallyl group, $A^2$ represents an organic residue derived from dicarboxylic acid having at least one structure of alicyclic structure and aliphatic chain structure, and wherein formula (3) is represented by the structure:

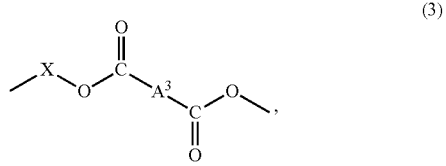

(3)

wherein $A^3$ represents an organic residue derived from dicarboxylic acid having at least one structure of alicyclic structure and aliphatic chain structure, X represents one or more kinds of organic residue derived from polyhydric alcohol, provided that, through ester bond, X can further have formula (2) as terminal group and a branched structure including formula (3) as constituent unit.

17. The transparent composite material according to claim 16, wherein the dicarboxylic acid in formulae (2) and (3) is dicarboxylic acid having alicyclic structure.

18. The transparent composite material according to claim 17, wherein the dicarboxylic acid having alicyclic structure is 1,4-cyclohexane dicarboxylic acid.

19. A transparent film comprising the transparent composite material according to claim 1, having a thickness of 10 to 200 μm.

20. The transparent film according to claim 19, wherein the tabular inorganic substance is oriented in a planar direction.

21. A transparent sheet comprising the transparent composite material according to claim 1, having a thickness of 200 to 5000 μm.

22. The transparent sheet according to claim 21, wherein the tabular inorganic substance is oriented in a planar direction.

23. A transparent plate comprising the transparent composite material according to claim 1, having a thickness exceeding 5000 μm.

24. The transparent plate according to claim 23, wherein the tabular inorganic substance is oriented in a planar direction.

25. A method for producing the transparent composite material as claimed in claim 1, comprising a step of mixing a solution of the tabular inorganic substance dispersed in solvent with a three-dimensionally cross-linkable resin composition.

26. The method for producing the transparent composite material as claimed in claim 25, comprising a step of spreading a mixture of resin component of a three-dimensionally cross-linkable resin composition, tabular inorganic substance and vaporizable solvents on a substrate to be coated and then allowing the tabular inorganic substance to be oriented in a planar direction by letting the solvents vaporize.

27. The method for producing a transparent composite material as claimed in claim 25, wherein the tabular inorganic substance is an inorganic lamellar compound.

28. The method for producing a transparent composite material as claimed in claim 27, comprising a step of mixing a solution containing resin component of the three-dimensionally cross-linkable resin composition dissolved in solvent with a dispersion solution containing the tabular inorganic substance swollen or cleaved in solvent.

29. The method for producing the transparent composite material as claimed in claim 25, comprising a step of spreading a mixture of resin component of a three-dimensionally cross-linkable resin composition, a tabular inorganic substance and solvents on a surface while applying a force parallel to the coated surface.

30. The method for producing a transparent composite material as claimed in claim 29, wherein the step of spreading the mixture on a surface while applying a force parallel to the coated surface is roll-coating method and doctor-blade method.

31. The method for producing a transparent composite material as claimed in claim 29, wherein the tabular inorganic substance is inorganic lamellar compound.

32. The method for producing a transparent composite material as claimed in claim 29, wherein the mixture is spread on a substrate to be coated and dried to obtain a resin film containing the tabular inorganic substance dispersed therein and then the film is cured to be a film or a sheet.

33. A method for producing the transparent film as claimed in claim 19, wherein after the three-dimensionally crosslinkable resin composition before curing, containing a tabular inorganic substance dispersed therein and solvent, is spread and applied on a smooth-surface plane and the solvent is dried, the composition is sandwiched between smooth-surface sheets or films and then curing is conducted.

34. A method for producing the transparent sheet as claimed in claim 21, wherein after the three-dimensionally crosslinkable resin composition before curing, containing a tabular inorganic substance dispersed therein and solvent, is spread and applied on a smooth-surface plane and the solvent is dried, the composition is sandwiched between smooth-surface sheets or films and then curing is conducted.

35. A method for producing the transparent plate as claimed in claim 23, wherein after the three-dimensionally crosslinkable resin composition before curing, containing a tabular inorganic substance dispersed therein and solvent, is spread and applied on a smooth-surface plane and the solvent is dried, the composition is sandwiched between smooth-surface sheets or films and then curing is conducted.

* * * * *